US006996110B1

(12) United States Patent
Amara et al.

(10) Patent No.: US 6,996,110 B1
(45) Date of Patent: Feb. 7, 2006

(54) DISTRIBUTED MPLS ARCHITECTURE

(75) Inventors: Satish Amara, Mount Prospect, IL (US); Shaji Radhakrishnan, Mount Prospect, IL (US); Rajesh Ramankutty, Mount Prospect, IL (US); Sanil Kumar Puthiyandyil, Lawrence, MA (US); Boby Joseph, Mount Prospect, IL (US)

(73) Assignee: 3Com Corporation, Marlborough, MA (US)

( * ) Notice: Subject to any disclaimer, the term of this patent is extended or adjusted under 35 U.S.C. 154(b) by 891 days.

(21) Appl. No.: 09/943,971

(22) Filed: Aug. 31, 2001

(51) Int. Cl.
*H04L 12/66* (2006.01)
*H04L 12/54* (2006.01)
*H04L 12/28* (2006.01)

(52) U.S. Cl. .................... 370/396; 370/389; 370/429

(58) Field of Classification Search .................... None
See application file for complete search history.

(56) References Cited

U.S. PATENT DOCUMENTS

| | | | | |
|---|---|---|---|---|
| 6,157,649 | A * | 12/2000 | Peirce et al. | 370/401 |
| 6,477,166 | B1 * | 11/2002 | Sanzi et al. | 370/395.1 |
| 6,535,507 | B1 * | 3/2003 | Li et al. | 370/356 |
| 6,674,756 | B1 * | 1/2004 | Rao et al. | 370/395.21 |
| 6,842,463 | B1 * | 1/2005 | Drwiega et al. | 370/468 |

OTHER PUBLICATIONS

Rosen et al., "Multiprotocol Label Switching Architecture", RFC: 3031, Jan. 2001, pp. 1-61.
Andersson et al., "LDP Specification", RFC: 3036, Jan. 2001, pp. 1-99.
Rekhter et al., "Carrying Label Information In BGP-4", RFC: 3107, May 2001, pp. 1-8.

* cited by examiner

*Primary Examiner*—Huy D. Vu
*Assistant Examiner*—Cynthia L. Davis
(74) *Attorney, Agent, or Firm*—McDonnell Boehnen Hulbert & Berghoff LLP

(57) ABSTRACT

A system and method for processing packets of information includes an ingress module. The ingress module receives a plurality of packets of information from a first network. The ingress module determines the type of each of the plurality of packets. A route server module is coupled to the ingress module. The route server module sends a distributed processing request to the ingress module. The ingress module receives the distributed processing request and, responsively, performs a first set of processing operations on selected ones of the plurality of packets. The selected ones of the plurality of packets are of a first type. The ingress module forwards others of the plurality of packets of information to the route server module. Each of the others of the plurality of packets are of a type distinct from the first type. The route server module receives the others of the plurality of packets of information and performs a second set of processing operations on the others of the plurality of packets of information.

22 Claims, 4 Drawing Sheets

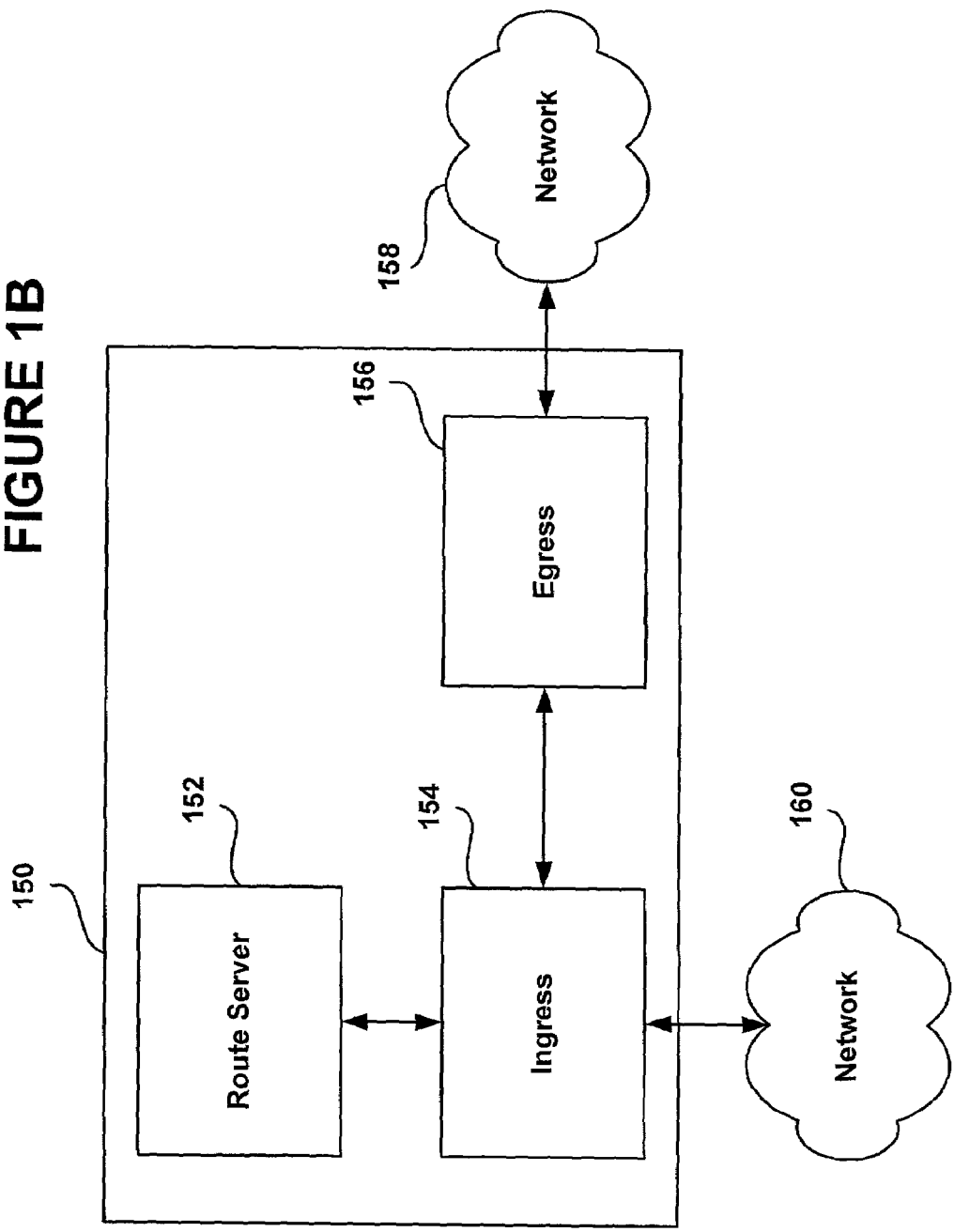

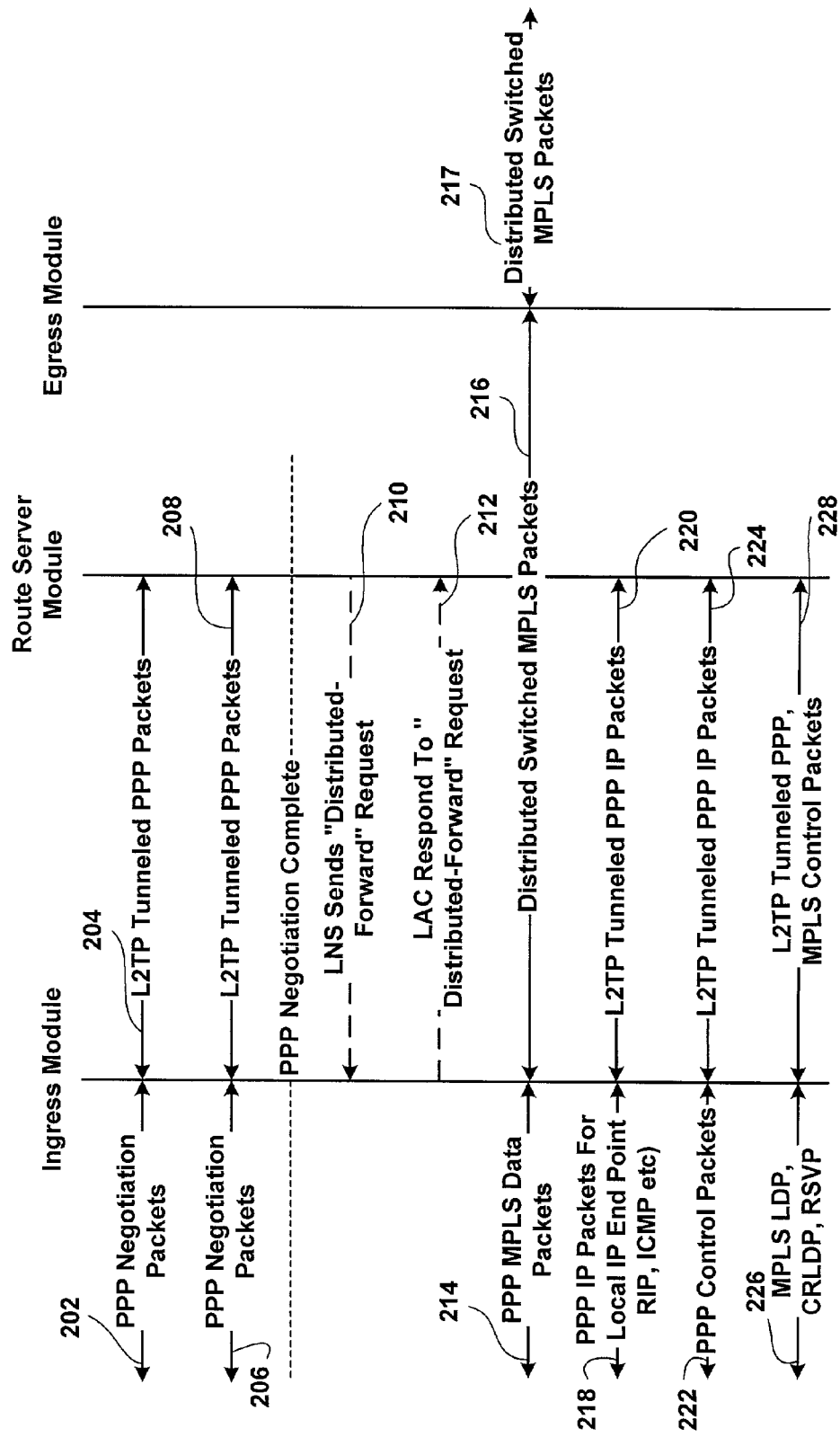

US 6,996,110 B1

DISTRIBUTED MPLS ARCHITECTURE

FIELD OF THE INVENTION

This present invention relates to switching information in a network. More specifically, it relates to a system and method for achieving distributed MPLS and packet switching using L2TP as a control mechanism.

BACKGROUND OF THE INVENTION

Multiple Protocol Label Switching (MPLS) networks use a switching technique whereby packets may be routed across a network. The packets transmitted across the MPLS network may take a variety of forms and may include a label. The label may be a fixed value, for example, an integer. The labels may be used to indicate the destination of the packet.

The MPLS network may include a plurality of nodes. The nodes may include Label Edge Routers (LERs) where information enters the network ("ingress nodes") and where information leaves the network ("egress nodes"). The LER may add a label to the head of the packet to indicate the destination of the packet. The LERs may ignore other information in the packet, for example, Internet protocol (IP) addresses and ATM VCI/VPI information.

The LER may be used in a MPLS network as the boundary between Layer 3 forwarding and MPLS forwarding. The LER may include functionality to add a label to an unlabeled packet ("an ingress LER") and remove labels from the packet ("an egress LER").

Label Switching Routers ("LSRs") may be used to route the packets between LERs. The LSRs may examine the label in a packet to determine the destination of the packet. In one example, the label may indicate an index in a table (stored in the switching node) and may be used to determine the outgoing link to which the packet may be forwarded. The table may be stored in a memory at the switching node, for example.

The LSRs may assign a new label and forward the packet on the link. Each label may have significance only locally. In other words, the packets may be forwarded hop-by-hop across the MPLS network. The label may indicate each hop rather than the entire end-to-end path from the source to the destination.

SUMMARY OF THE INVENTION

The system and method of the present invention advantageously provides for the distributed processing of labeled packets in a device. For example, a first type of packet may be processed by an ingress module and a second type of packet may be processed by a route server module.

In one example of the present invention, a system for processing packets of information includes an ingress module, which is coupled to a route server module.

The ingress module may receive a plurality of packets of information from a first network and may determine the type of each of the plurality of packets. The route server module may send a distributed processing request to the ingress module.

The ingress module may receive the distributed processing request and, responsively, may perform a first set of processing operations on selected ones of the plurality of packets. The ingress module may receive the FTN and NHLFE tables from router server. The selected ones of the plurality of packets may be of a first type. The ingress module may forward others of the plurality of packets of information to the route server module. Each of the others of the plurality of packets may be of a type distinct from the first type.

The route server module may receive the others of the plurality of packets of information and performs a second set of processing operations on the others of the plurality of packets of information.

The first set of processing operations may include forwarding the selected ones of the plurality of packets of information to an egress module. The second set of processing operations includes establishing a connection with an entity on the Internet. The first type of packet may be a data type.

The system may further include an egress module, and the egress module may be coupled to the ingress module. The egress module may receive the others of the plurality of packets and route the packets to the Internet.

These as well as other aspects and advantages of the present invention will become more apparent to those of ordinary skill in the art by reading the following detailed description, with reference to the accompanying drawings.

BRIEF DESCRIPTION OF THE DRAWINGS

Preferred embodiments of the present inventions are described with reference to the following drawings, wherein:

FIGS. 1a and 1b are diagrams illustrating a preferred embodiment of the system for distributed MPLS processing in accordance with the present invention;

FIG. 2 is a call flow diagram illustrating distributed MPLS processing in accordance with a preferred embodiment of the present invention;

DETAILED DESCRIPTION OF PREFERRED EMBODIMENTS

Figure 1A:
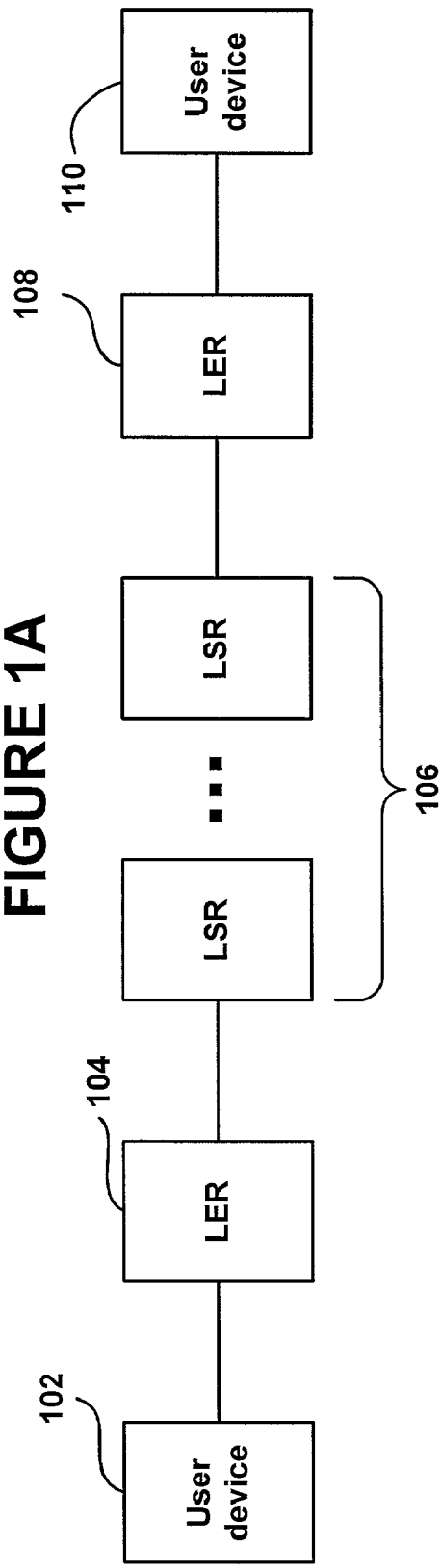

Referring now to FIG. 1a, a system includes a user device 102, a label edge router (LER) 104, a plurality of label switch routers (LSRs) 106, a LER 108, and a user device 110. The user device 102 is coupled to the LER 104. The LER 104 is coupled to the LSRs 106. The LSRs 106 are coupled to the LER 108. The LER 108 is coupled to the user device 110.

The user devices 102 and 110 may be any type of device used to transmit and/or receive information. In one example, the user device may be a personal computer. Other types of user devices are possible.

The functions of the LERs 104 and 108 may be implemented by a processor executing computer instructions stored in a memory. The LERs 104 and 108 may include an ingress module, egress module, and route server module, as described elsewhere in this specification. The LERs 104 and 108 may receive packets from the user devices and insert a label into these packets and forward the packets to the LSRs 106. The LERs 104 and 108 may also perform distributed switching, which is also described elsewhere in this specification.

The functions of the LSRs 106 may be implemented by processors executing computer instructions stored in a memory. The LSRs 106 may include an ingress module, egress module, and route server module, as described elsewhere in this specification. The LSRs 106 may receive a packet having a label and route the packet to the next destination. In the routing process, the LSRs 106 may replace the current label with a new label. The new label may signify the destination of the packet. The LSRs 106 may also perform distributed switching, which is described elsewhere in this specification.

The LERs 104 and 108 may determine a forwarding equivalence class ("FEC") for the incoming packets that, based on the assigned FEC, are forwarded in the same manner (e.g., over the same path, with the same forwarding treatment). The assignment of a particular FEC to a particular label may be done once, as the packet enters the network, and the FEC to which the packet is assigned is encoded as a label. When the packet is forwarded to its next hop, the label may be sent along with it, i.e., the packets may be labeled before they are forwarded. At subsequent hops, there is no further analysis of the packet's network layer header. Rather, the label is used as an index into a table that specifies the next hop and a new label. At subsequent hops, the LSRs 106 may use the information from the packet to determine the outgoing link and a new label for the outgoing link. The LSRs 106 then may swap the label in the MPLS header with a new label, and forward the packet.

Each LER 104 and 108 or LSR 106 may negotiate a label for each FEC with its neighbors along the path. Information on the topology of the network may be maintained by one or more routing protocols such as an open shortest path first ("OSPF"), a routing information protocol ("RIP"), or a border gateway protocol ("BGP"), for example. For each route or aggregation of routes, a neighbor router may assign a label, and this information may be distributed to neighboring LERs 104 and 108 or LSRs 106 using a label distribution protocol (LDP) or can be piggybacked on BGP route updates (RFC 3107, Carrying label information). For example, the system may use the RFC-3036 protocol developed by the Internet engineering task force ("IETF").

Referring now to FIG. 1b, a device 150 includes a route server module 152, an ingress module 154, an egress module 156, a network 158, and a network 160. The route server module 152 is coupled to the ingress module 154. The ingress module 154 is coupled to the egress module 156 and the network 160. The egress module 156 is coupled to the network 158.

The functions of the route server module 152 may be implemented by a processor executing instructions stored in a memory. The route server module 152 may receive and route IP data packets, before the sending of a distributed switching message to the ingress module 154. The route server module 152 may send a message to the ingress module 154 asking the ingress module 154 to process all data packets received from the PSTN. The route server module 152 may also process all control messages and IP packets having local end points. The route server module 152 may perform other functions as well. The route server module may send FTN and NHLE entries to the ingress module for label swapping.

The route server module 152 may send the message to the ingress module 154 asking the ingress module to process all data packets upon the occurrence of a predetermined condition. For example, at the time the route server module 152 completes the PPP negotiation process, this message may be generated.

The functions of the ingress module 154 may also be implemented by a processor executing instructions stored in a memory. The ingress module 154 may receive IP packets from the network 160 and determine the type of packet. For example, the ingress module 154 may determine whether the IP packet is a control packet, a data packet, or any packet destined for a local connection. Based upon this determination, the ingress module 154 may route the packet to the egress module 156, route server module 152, or perform further processing itself.

The ingress module 154 may also perform distributed forwarding. The ingress module 154 may, for example, route IP data messages to the network 158 after receiving a distributed switching request.

In addition, the ingress module 154 may receive messages from the network 158, process the messages, and forward the messages to a destination. In one example, an IP packet may be received by the ingress module 154 from the network 158. The ingress module 154 may determine the destination of the IP packet, encapsulate the packet with an PPP header, and forward the encapsulated packet to a destination on the network 158.

The functions of the egress module 156 may also be implemented by a processor executing instructions stored in a memory.

The network 158 may be any network capable of transporting any type of information. For example, the network may be the Internet and transport IP packets. In addition, the network 158 may be a combination of networks. Other examples of networks are possible.

The network 160 may be any network capable of transporting any type of information. For example, the network may be a PSTN and transmit information according to the point-to-point protocol (PPP).

In one example of the operation of the system of FIG. 1b, the ingress module 154 initially tunnels all PPP packets coming from the network 160 to the route server module 152. The L2TP protocol is used to tunnel PPP packets from ingress to route server module. In this example, ingress router acts as LAC and router server as LNS. The route server module 152 processes the packets. For instance, the route server module 152 may perform MPLS negotiation, PPP negotiation, and determine IP network for the link with the network 160.

The route server module 152 may send a control packet, for example, and L2TP control packet, to the LAC within the ingress module 154. The control packet may request that distributed switching may take place. The control packet may also contain FTN and NHLE tables for label swapping. The ingress module 154 may send a response message, for example, a response packet acknowledging the receipt of the control packet. The control packet may cause the ingress module 154 to halt the forwarding data packets to the route server module 152, and, instead, keep the packets for further processing. The ingress module 154 may also receive updated label swapping and forwarding table from the route server module 152.

The ingress module 154 may strip off the PPP header and perform decompression, if needed. The ingress module 154 may then forward the packet to the egress module 156.

Incoming packets (from the network 158) may be received at the egress module 156 and forwarded to the ingress module 154. The ingress module 154 may encapsulate the packets with a header and may perform compression, label swap and transmit the packets over a link to the network 160.

The ingress module 154 may also route packets coming from the network 160 destined for PPP local endpoints (indicated by the IP addresses), to be sent to the route server module 152.

Referring now to FIG. 2, a method of distributed switching is described in reference to a system that includes an ingress module, which is coupled to a route server module. An egress module may be coupled to the ingress module. The ingress module may include a LAC and a distributed forwarding agent, and the route server module may include an LNS. The ingress module may be coupled to a PSTN and the Internet. The route server module may be coupled to the Internet.

At step 202, PPP negotiation packets are sent from an outside source, for example, from a user, to the ingress module. For example, the PPP negotiation packets may be sent to the ingress module.

At step 204, a tunnel is created between the ingress module and the route server module. For example, the tunnel may be established according to the L2TP protocol. Other protocols may also be used.

At step 206, PPP negotiation packets are sent from an outside source, for example, from a user, to the ingress module. For example, the PPP negotiation packets may be sent to the ingress module.

At step 208, a tunnel is created between the LAC and the route server module. For example, the tunnel may be the same tunnel established with the LNS in the route server module according to the L2TP protocol.

At step 210, the LNS in the route server module sends a message to the ingress module to tell the ingress module to distribute the switching of all subsequently received packets.

At step 212, a response message is sent from the LAC in the ingress module to the LNS in the route server module.

From this point, at steps 214, 216, and 217, all PPP encapsulated outgoing data packets from the PSTN network to the Internet will be forwarded to the distributed switching agent in the ingress module. The ingress module will also get updated swapping and forwarding tables from the route server module to support the forwarding. The ingress module may remove the PPP header and give the IP data packets to the distributed forwarding agent in the ingress module. All incoming IP packets reaching the distributed switching module for the PPP link will be given to the ingress module. The ingress module will encapsulate the PPP header and may compress the packet. The ingress module may also perform label swapping and send the packet over the PPP link.

At steps 218 and 220, all IP packets coming from the PPP link destined for PPP local endpoint addresses are sent to the LNS in the route server module. These packets include ICMP, RIP, and other routing protocol packets, for example.

At step 222, PPP control packets coming from the PPP link are received at the ingress module. At step 224, the PPP control packets are tunneled to the LNS in the route server module.

At step 226, MPLS LDP, CRLDP and RSVP-TE packets are received at the ingress module. At step 228, these packets are tunneled to the LNS in the route server module.

Figure 3:
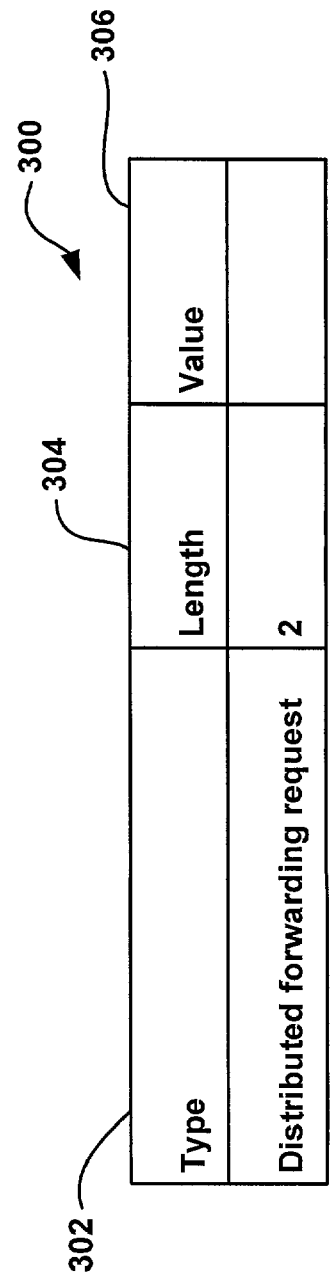
FIG. 3 is a diagram illustrating a distributed switching request in accordance with a preferred embodiment of the present invention.

Referring now to FIG. 3, one example of a distributed forward request message is described. The message may be in the form of an attributed value pair (AVP) 300. The AVP 300 may include a type field 302, a length field 304, and a value field 306. In one example, the type field may be set to "distributed forwarding request," the length field may be set to 2, and the value field may remain empty. Other examples of messages and field values are possible.

Figure 4:
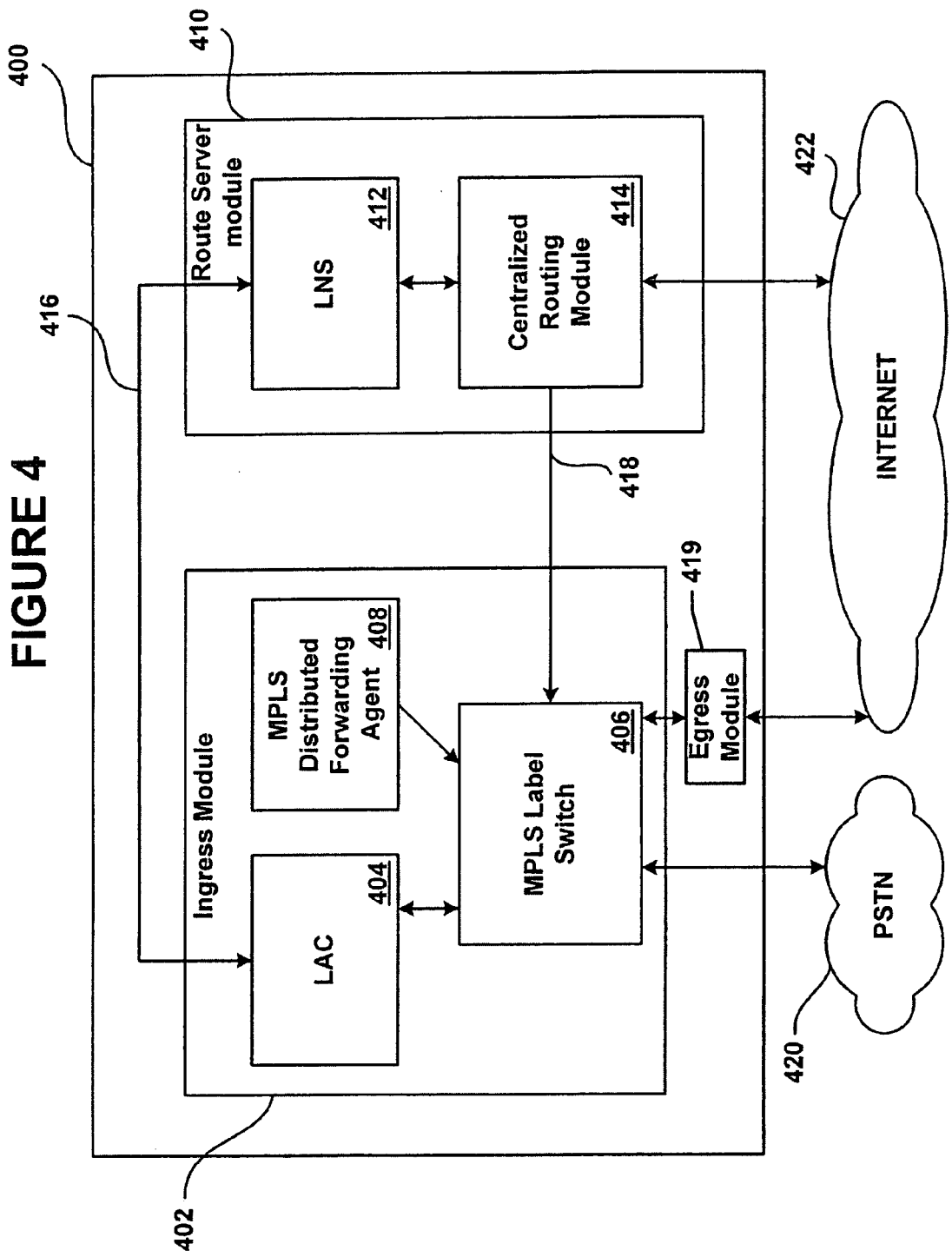
FIG. 4 shows a diagram showing a device for implementing distributed MPLS processing in accordance with a preferred embodiment of the present invention.

Referring now to FIG. 4, one example of a system 400 for distributed switching is described. An ingress module 402 includes a LAC 404, a MPLS label switch 406, and a MPLS distributed forwarding agent 408. The functions of any of these elements may be implemented using a processor executing instructions stored in a memory. The ingress module 402 may be coupled to an egress module 419. The egress module 419 may be coupled to the PSTN 420.

The system 400 also includes a route server module 410. The route server module 410 includes an LNS module 412 and a centralized routing module 414. The functions of any of these elements may also be implemented using a processor executing instructions stored in a memory. The system 400 is coupled to a PSTN 420 and the Internet 422. The system 400 may be an LER, LSR, or any other type of device that routes packets or any other type of information.

A lead 416 from the LNS to the LAC may forward mapping tables (FTN and NHLE entities). The connection may be a physical connection or a virtual connection.

A lead 418 passes transmission rules from the centralized routing module 414 to the MPLS distributed forwarding agent 408. The lead 418 may be a physical connection or virtual connection.

The MPLS distributed forwarding agent 408 are coupled to the MPLS label switch 406. The MPLS label switch may be coupled to a PSTN 420 and the Internet 422. The centralized routing module 414 may also be coupled to the Internet 422.

The LAC 404 may forward packets to the route server module 410 in the absence of a distributed switching request. The ingress module may also perform decompression on packets received on an incoming link. Conversely, perform compression on packets going out onto the link. The ingress module may also determine for incoming packets from the link the type of packets. For example, the packets may be control packets, data packets, packets destined for a local endpoint, or MPLS LDP, CRLDP, or RSVP packets. Based upon the determined packet type, the LAC 404 may route the packets to an appropriate location. For example, control packets, packets destined for a local endpoint, and LDP label distribution protocol (MPLS LDP), Constraint Based LDP (CRLDP), and Resource reservation Protocol-Traffic Engineering (RSVP-TE) packets may be routed to a route server module via the link 416.

The MPLS Label switch 406 may perform label switching. The MPLS label switch 406 may apply the switching rules (supplied by the centralized routing module) to the packets and switch the packets to a destination. The MPLS label switch 406 may also receive packets from the Internet and forward the packets to the LAC 404 for processing for example, if there is no FTN entry for the packet.

The MPLS distributed forwarding agent 408 may label the packets using the table received from the LAC 404. The MPLS distributed forwarding agent 408 may also receive packets from the egress module 419 and route the packets to the LAC 402.

The LNS 412 may supply label tables to the LAC 404. The LNS 412 may also receive packets from the LAC 404 to be routed to a destination, control packets, negotiation packets, or any other type of packets. The LNS 412 may forward these to the centralized routing module 414.

The centralized routing module 414 supplies transmission rules to the MLPS label switch. The centralized routing module 414 also may route packets (received via the LNS) to a destination on the Internet 422.

In one example of the operation of the system of FIG. 4, a control packet may be received by the MPLS label switch 406. The packet may be a PPP negotiation packet and the MPLS label switch 406 may not contain a rule for this type of packet. The MPLS label switch 406 may forward the packet to the LAC 404. The LAC 404 may forward the packet to the LNS 412. The LNS 412 may forward the packet to the centralized routing module 414. The centralized routing module 414 may perform whatever service is required (e.g., PPP negotiation).

After negotiation is completed by the route server module 410 and centralized routing module 414, a MPLS distributed switching packet may be sent from LNS 412 to LAC 404. The MPLS distributed switching packet may inform the LAC 404 to begin performing distributed switching. The LAC 404 may send an acknowledgement packet.

Subsequently, data packets may be received at the MPLS label switch 406 at the ingress module 402. The MPLS label switch 406 may include a filter module, which is coupled to the MPLS label switch and the LAC module. The filter module may contain filter rules and actions to be taken when filter rules are matched. For example, the filter rules can be PPP negotiations, MPLS control packet and actions to be taken is the packets are forwarded to LAC. By default, if there is no matching rule then packets are forwarded to MPLS label switch. This functionality can also be integrated in MPLS label switch.

The ingress module may examine the packets, check the packet type, and determine that the packets are data packets. For example, the packet may have a type field. The algorithm may examine the type field and from the examination determine the type of packet. Alphanumeric characters may be used to indicate the type. Other mechanisms and algorithms may also be used. The MPLS distributed forwarding agent 408 may place a label in the packets. The MPLS label switch 406 may forwards the packet to the Internet 422 via the egress module 419, without involving the route server module 410.

The MPLS label switch 406 at the ingress module 402 may also subsequently receive control or other non-data packets. The ingress module may examine these packets, determine the packets are non-data packets and transmit the packets to the LNS 412 in the route server module 410. The LNS 412 may route the packets to the centralized routing module 414.

In view of the wide variety of embodiments to which the principles of the present invention can be applied, it should be understood that the illustrated embodiments are exemplary only, and should not be taken as limiting the scope of the present invention. While various elements of the preferred embodiments have been described as being implemented in software, in other embodiments in hardware or firmware implementations may alternatively be used, and vice-versa.

It will be apparent to those of ordinary skill in the art that methods involved in the system and method for a distributed MPLS architecture may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A system for processing packets of information, the system comprising:
    an ingress module comprising an L2TP Access Concentrator (LAC), the ingress module receiving a plurality of packets of information from a first network, the ingress module determining the type of each of the plurality of packets; and
    a route server module comprising an L2TP Network server (LNS), the route server module being coupled to the ingress module, the route server module sending a distributed processing request to the ingress module;
    wherein the ingress module receives the distributed processing request and, responsively, performs Multi-Protocol Label Switching (MPLS) processing on data packets of the plurality of packets having an MPLS label and routes the MPLS processed packets in accordance with the MPLS label;
    wherein the ingress module forwards non-data packets of the plurality of packets of information to the route server module via an L2TP tunnel established between the LAC and the LNS; and
    wherein the route server module receives the non-data packets of the plurality of packets of information and performs centralized processing operations on the non-data packets.

2. The system of claim 1, wherein the MPLS processing comprises swapping a first MPLS label with a second MPLS label.

3. The system of claim 1, wherein the centralized processing comprises establishing a connection with an entity on the Internet.

4. A method comprising:
    receiving a plurality of packets of information from a first network at an ingress module, the ingress module comprising an L2TP Access Concentrator (LAC);
    determining the type of each of the plurality of packets;
    sending a distributed processing request from a route server module to the ingress module, the route server module comprising an L2TP Network server (LNS);
    receiving the distributed processing request at the ingress module and, responsively, performing Multi-Protocol Label Switching (MPLS) processing on data packets of the plurality of packets having an MPLS label and routes the MPLS processed packets in accordance with the MPLS label;
    forwarding non-data packets of the plurality of packets of information from the ingress module to the route server module via an L2TP tunnel established between the LAC and the LNS; and
    receiving the non-data packets of the plurality of packets of information at the route server module and performing centralized processing on the non-data packets at the route server module.

5. The system of claim 4, wherein the MPLS processing comprises forwarding the data packets of the plurality of packets of information to an egress module.

6. The system of claim 4, wherein the centralized processing comprises establishing a connection with an entity on the Internet.

7. A routing device comprising:
    an ingress portion comprising an L2TP Access Concentrator (LAC), the ingress portion receiving negotiation packets; and
    a route server portion coupled to the ingress portion, the route server portion comprising an L2TP Network server (LNS), the route server portion receiving the negotiation packets from the ingress portion via an L2TP tunnel established between the LAC and the LNS and completing a negotiation, the route server portion sending a distributed switching request message to the ingress portion upon the completion of a negotiation;

wherein the ingress portion receives the distributed switching request message and, responsively, sends a reply message to the route server portion; and wherein the ingress portion, upon the receipt of the distributed switching request message, performs Multi-Protocol Label Switching (MPLS) processing on subsequently received data packets having an MPLS label and routes the MPLS processed packets in accordance with MPLS label.

8. The routing device of claim 7 wherein the ingress portion determines a forwarding equivalence class.

9. The routing device of claim 7, wherein the data packets include labeling information and the ingress portion uses the label information from the data packets to determine an outgoing link.

10. The routing device of claim 7, wherein the ingress portion forwards all control packets to the route server portion via the tunnel established between the LAC and the LNS.

11. The routing device of claim 7, wherein all MPLS LDP, CRLDP, or RSVP packets are routed to the route server portion via the tunnel established between the LAC and the LNS.

12. A system comprising:
means for receiving a plurality of packets of information from a first network at an ingress module comprising an L2TP Access Concentrator (LAC);
means for determining the type of each of the plurality of packets;
means for sending a distributed processing request from a route server module comprising an L2TP Network Server (LNS) to the ingress module;
means for receiving the distributed processing request at the ingress module and, responsively, performing Multi-Protocol Label Switching (MPLS) processing on data packets of the plurality of packets having an MPLS packets of the plurality of packets having an MPLS label and routes the MPLS processed packets in accordance with the MPLS label;
means for forwarding non-data packets of the plurality of packets of information from the ingress module to the route server module via an L2TP tunnel established between the LAC and the LNS; and
means for receiving the non-data packets of the plurality of packets of information at the route server module and performing centralized processing on the non-data packets of the plurality of packets of information at the route server module.

13. A computer program on a computer readable medium, the program comprising:
first code for receiving a plurality of packets of information from a first network at an ingress module comprising an L2TP Access Concentrator (LAC);
second code for determining the type of each of the plurality of packets;
third code for sending a distributed processing request from a route server module comprising an L2TP Network Server (LNS) to the ingress module;
fourth code for receiving the distributed processing request at the ingress module and, responsively, performing Multi-Protocol Label Switching (MPLS) processing on data packets of the plurality of packets packets of the plurality of packets having an MPLS label and routes the MPLS processed packets in accordance with the MPLS label;
fifth code for forwarding non-data packets of the plurality of packets of information from the ingress module to the route server module via an L2TP tunnel established between the LAC and the LNS; and
sixth code for receiving the non-data packets of the plurality of packets of information at the route server module and performing centralized processing on the non-data packets of the plurality of packets of information at the route server module.

14. The system of claim 1, wherein the MPLS processing comprises assigning an MPLS label to each of the data packets.

15. The system of claim 1, wherein the non-data packets comprise packets selected from the group consisting of (i) control packets, (ii) routing protocol packets, (iii) MPLS label distribution protocol (LDP) packets, (iv) Constraint Based LDP (CRLDP) packets, and (v) Resource Reservation Protocol-Traffic Engineering (RSVP-TE) packets.

16. The method of claim 4, further comprising:
removing a Point-to-Point Protocol (PPP) header from each of the data packets of the plurality of packets at the ingress module.

17. The method of claim 16, further comprising:
performing decompression on the data packets of the plurality of packets at the ingress module.

18. The method of claim 4, further comprising:
encapsulating each of the data packets with a Point-to-Point Protocol (PPP) header; and
forwarding the encapsulated packet to a destination on a second network that carries packets according to the PPP.

19. The method of claim 18, further comprising:
performing compression on the data packets of the plurality of packets at the ingress module.

20. The method of claim 4, wherein prior to receiving the distributed processing request at the ingress module, the ingress module tunnels all received packets of the plurality of packets of information to the route server module via the tunnel established between the LAC and the LNS.

21. The method of claim 4, further comprising:
receiving, at the ingress module, routing table entries sent from the route server module.

22. The method of claim 4, wherein sending the distributed processing request from the route server module to the ingress module occurs in response to the route server module completing a given centralized processing operation selected from the group consisting of (i) a Point-to-Point Protocol negotiation process, and (ii) an MPLS negotiation process.

* * * * *